United States Patent
Okumura

(10) Patent No.: US 9,019,577 B2
(45) Date of Patent: Apr. 28, 2015

(54) IMAGE PROCESSING DEVICE AND IMAGE READING APPARATUS

(71) Applicant: KYOCERA Document Solutions Inc., Osaka (JP)

(72) Inventor: Ryuichi Okumura, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/137,107

(22) Filed: Dec. 20, 2013

(65) Prior Publication Data

US 2014/0177015 A1    Jun. 26, 2014

(30) Foreign Application Priority Data

Dec. 25, 2012  (JP) ................. 2012-281763

(51) Int. Cl.

| H04N 1/04 | (2006.01) |
|---|---|
| H04N 1/10 | (2006.01) |
| H04N 1/40 | (2006.01) |
| H04N 1/401 | (2006.01) |
| H04N 1/407 | (2006.01) |

(52) U.S. Cl.
CPC ............ H04N 1/10 (2013.01); H04N 1/40093 (2013.01); H04N 1/401 (2013.01); H04N 1/4072 (2013.01); H04N 2201/0434 (2013.01)
USPC ............ 358/486; 358/474; 358/464; 358/466

(58) Field of Classification Search
USPC .................................. 358/486, 474, 464, 466
See application file for complete search history.

(56) References Cited

U.S. PATENT DOCUMENTS 5,834,762 A    11/1998   Matsuda et al.
7,072,527 B1 *  7/2006   Nako ............................ 382/290

FOREIGN PATENT DOCUMENTS

| EP | 1032191 A3 | 1/2000 |
|---|---|---|
| EP | 1032191 A2 | 8/2000 |
| JP | 05-153363 A | 6/1993 |
| JP | 2000-354166 A | 12/2000 |
| JP | 2001-111811 A | 4/2001 |
| JP | 2002-262053 A | 9/2002 |
| JP | 2005-051383 A | 2/2005 |
| JP | 2005-115768 A | 4/2005 |

OTHER PUBLICATIONS

The extended European search report issued by the European Patent Office on May 9, 2014, which corresponds to EP13196188.0-1902 and is related to U.S. Appl. No. 14/137,107.
An Office Action; "Notice of Reasons for Rejection," issued by the Japanese Patent Office on Mar. 12, 2015, which corresponds to Japanese Patent Application No. 2012-281763 and is related to U.S. Appl. No. 14/137,107.

* cited by examiner

*Primary Examiner* — Houshang Safaipour
(74) *Attorney, Agent, or Firm* — Studebaker & Brackett PC

(57) ABSTRACT

An image processing device includes a width specifying part, a parameter value specifying part, and a density correcting part. The width specifying part specifies a width between both ends of an input image of a book about each line of the input image. The parameter value specifying part specifies a value of a density correcting parameter corresponding to the width specified by the width specifying part. The density correcting part corrects density of each line on the basis of the value of the density correcting parameter specified by the parameter value specifying part.

10 Claims, 7 Drawing Sheets

IMAGE PROCESSING DEVICE AND IMAGE READING APPARATUS

This application is based on and claims the benefit of priority from Japanese Patent application No. 2012-281763 filed on Dec. 25, 2012, the entire contents of which are incorporated herein by reference.

BACKGROUND

The present disclosure relates to an image processing device and an image reading apparatus including the same.

In an image reading apparatus, such as a copying machine and a scanner, when an image of a book, particularly a thick book having a large number of pages, is read, the book is placed on a platen in an opened state of a desired page and scanning is executed. At that time, if a bind portion of the book is floated from the platen, a noise of black pixels is generated at a part corresponding to the bind portion in a document image. Because such a noise is unneeded by a user, it is desirable to automatically eliminate the noise.

In a certain image reading apparatus, the noise is eliminated in a simple process, such as a labeling process, by extracting a connected region of the black pixels. Such a manner poses no problem if a range corresponding to the noise region of the bind portion is a blank (i.e., a region containing no character information). However, if the significant information, such as characters and pictures, is contained in the region, the significant information may be eliminated together with the noise.

Due to that, there is an image reading apparatus configured to determine a range in which a noise of a bind portion of a book is searched in an input image, to specify a noise region of the bind portion within the determined range, to separate the noise region from other information region, and to eliminate the separated noise region.

In such a manner of the image reading apparatus, since it is difficult to completely separate the noise region of the bind portion from the other information region, intensity of elimination of the noise is selected by the user, and then, a parameter is finely adjusted.

However, because the user is unable to readily understand how much the noise should be eliminated, the user is required to find a suitable setting by reading or copying an image by many times while changing the intensity of the elimination of the noise. As a result, extra labor and wasteful reading or copying of the image may be coerced.

SUMMARY

In accordance with an embodiment of the present disclosure, an image processing device includes a width specifying part, a parameter value specifying part, and a density correcting part. The width specifying part is configured to specify a width between both ends of an input image of a book about each line of the input image. The parameter value specifying part is configured to specify a value of a density correcting parameter corresponding to the width specified by the width specifying part. The density correcting part is configured to correct density of each line on the basis of the value of the density correcting parameter specified by the parameter value specifying part.

In accordance with another embodiment of the present disclosure, an image reading apparatus includes an image processing device and a scanner part configured to read an input image from a book. The image processing device includes a width specifying part, a parameter value specifying part, and a density correcting part. The width specifying part is configured to specify a width between both ends of an input image of the book about one line of the input image. The parameter value specifying part is configured to specify a value of a density correcting parameter corresponding to the width specified by the width specifying part. The density correcting part is configured to correct density of each line on the basis of the value of the density correcting parameter specified by the parameter value specifying part.

The above and other objects, features and advantages of the present disclosure will become more apparent from the following description when taken in conjunction with the attached drawings illustrating preferable and specific embodiment of the present disclosure.

DETAILED DESCRIPTION

In the following, an embodiment of the present disclosure will be described with reference to the drawings.

Figure 1:
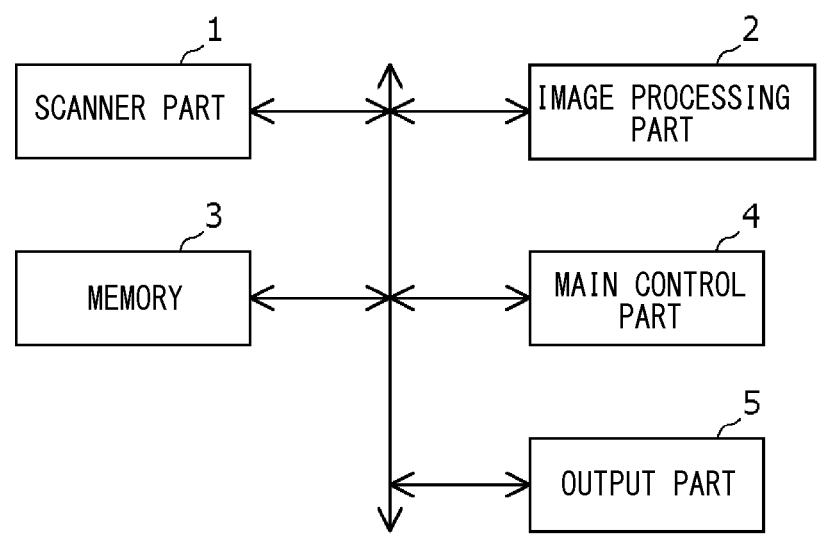
FIG. 1 is a block diagram showing a configuration of an image reading apparatus according to an embodiment of the present disclosure.

FIG. 1 is a block diagram showing a configuration of an image reading apparatus according to the embodiment the present disclosure. The image reading apparatus shown in FIG. 1 includes a scanner part 1, an image processing part 2, a memory 3, a main control part 4, and an output part 5 which are connected with each other.

The scanner part 1 is configured to optically read a page image of a document and to generate and output image data of the page image (i.e., an input image). The image data includes image information of each pixel, such as RGB values.

The image processing part 2 is configured to execute predetermined processes on the image data of the input image. The image processing part 2 executes the predetermined processes on the image data outputted from the scanner part 1 or on image data on which previous processes has been executed on the image data outputted from the scanner part 1. The image processing part 2 writes the image data executed by the predetermined processing into a predetermined memory area in the memory 3. For example, the image processing part 2 is composed of one or a plurality of ASICs (Application Specific Integrated Circuit).

Figure 2:
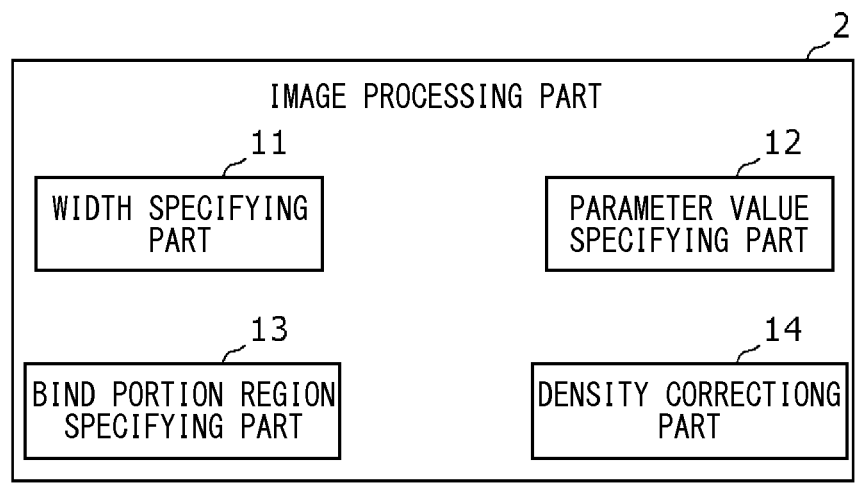
FIG. 2 is a block diagram showing a configuration of an image processing part in the image reading apparatus of the embodiment of the present disclosure.
Figure 3:
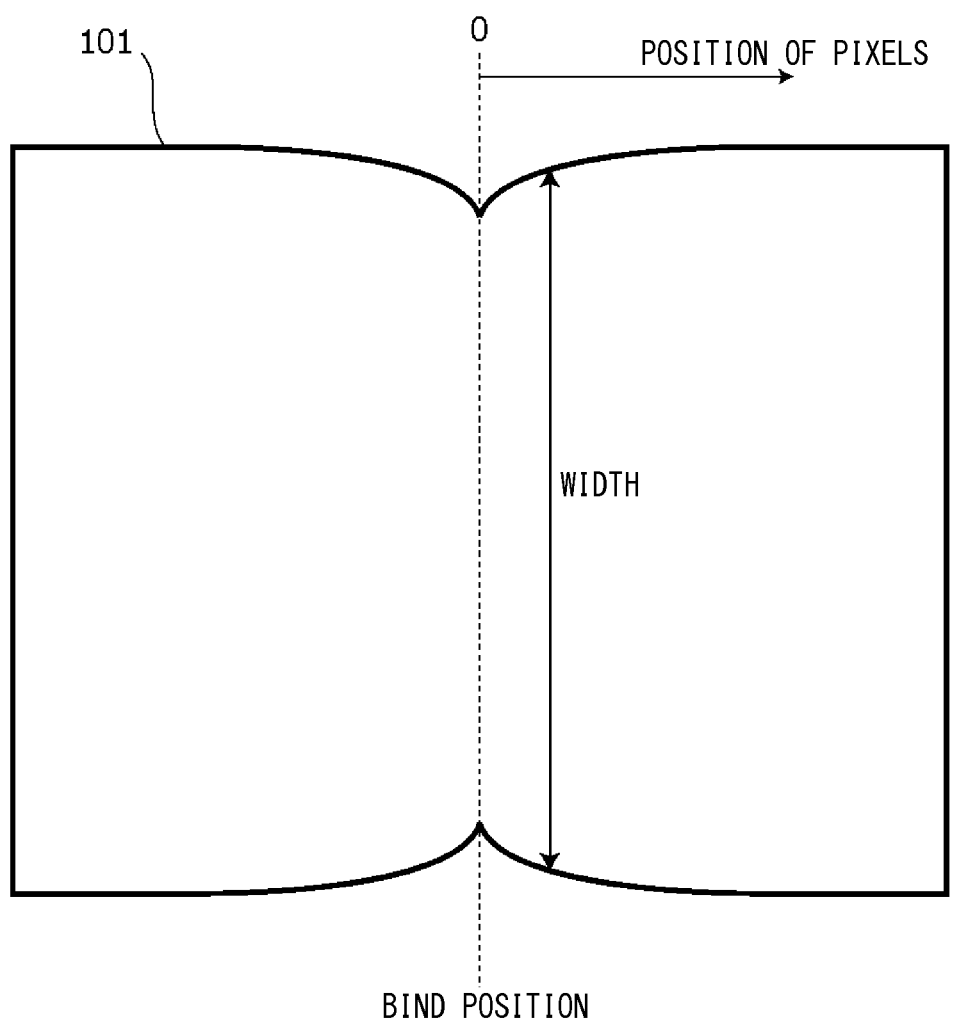
FIG. 3 is a schematic diagram showing one exemplary input image of a book read by the image reading apparatus of the embodiment of the present disclosure.

FIG. 2 is a block diagram showing a configuration of the image processing part 2 shown in FIG. 1, and FIG. 3 is a schematic diagram showing one exemplary input image of a book.

The image processing part 2 includes a width specifying part 11, a parameter value specifying part 12, a bind portion region specifying part 13, and a density correcting part 14.

The width specifying part 11 is configured to specify a width between both ends of the input image about each line of the input image of the book. A unit of the width may be a number of pixels or a ratio to a maximum width (i.e., a width of a part where the book is in close contact with the contact glass). For instance, the width specifying part 11 specifies edges 101 from a distribution of density of the input image of the book and specifies a distance between two intersection points of one line and the edges 101 as a width. Alternatively, the width may be specified on the basis of other known techniques.

Incidentally, the input image of the book is what is read by the scanner part 1 from the book placed on the platen in an opened wide state.

The parameter value specifying part 12 is configured to specify a value of a density correcting parameter corresponding to the width specified by the width specifying part 11.

The bind portion region specifying part 13 is configured to specify a region of the bind portion in the input image of the book. For example, the bind portion region may be specified as a region having the above-mentioned width shorter than the maximum width by a predetermined length or more, or may be specified, after a bind position is specified, as a region extending to a predetermined pixel position from the specified bind position. The bind portion region also may be specified on the basis of other known techniques.

The density correcting part 14 corrects density of each line on the basis of the density correcting parameter specified by the parameter value specifying part 12. In the embodiment, the density correcting part 14 corrects the density within the above-mentioned bind portion region and does not correct the density of the region other than the bind portion region.

Figure 4:
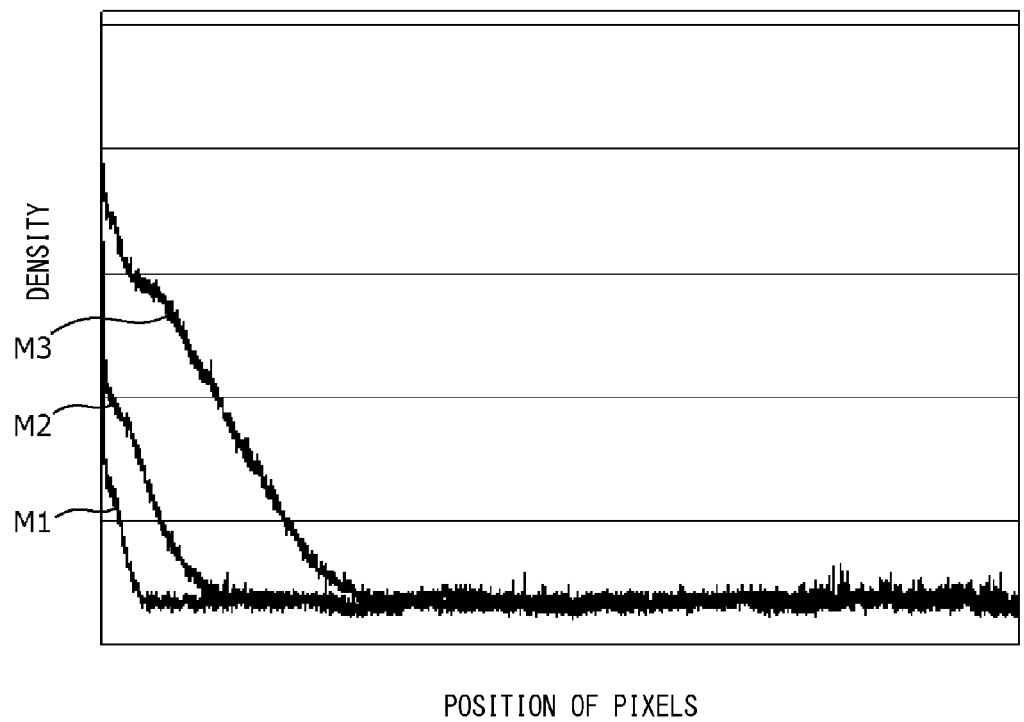
FIG. 4 is a graph showing a relationship between position and density of pixels in the input image of the book placed on a platen (a contact glass) in an opened wide state in the image reading apparatus of the embodiment of the present disclosure.

FIG. 4 is a graph used for explaining a relationship between the position and the density of the pixels in the input image of the book placed on the platen (the contact glass) in the opened wide state. The position of the pixels indicates a distance from the bind position as shown in FIG. 3.

A property M1 in FIG. 4 indicates one exemplary relationship between the position and the density of the pixels in the input image in a case where the book placed on the platen is pressed by a document cover (including an automatic document feeding device). In this case, the document cover considerably blocks off ambient light incident on the platen.

A property M2 in FIG. 4 indicates one exemplary relationship between the position and the density of the pixels in the input image in a case where the book placed on the platen is pressed by hands of the user without pressing the book by the document cover (including the automatic document feeding device). In this case, the document cover does not block off the light incident on the platen. Moreover, in this case, because the book is pressed by the hands, floating of the bind portion from the platen is small.

A property M3 in FIG. 4 indicates one exemplary relationship between the position and the density of the pixels in the input image in a case where the book placed on the platen is pressed neither by the document cover (including the automatic document feeding device) nor by the hands of the user. In this case, the document cover does not block off the light incident on the platen. Moreover, in this case, because the book is pressed neither by the document cover nor the hands, the floating of the bind portion from the platen is large as compared to the cases of the properties M1 and M2.

Figure 5:
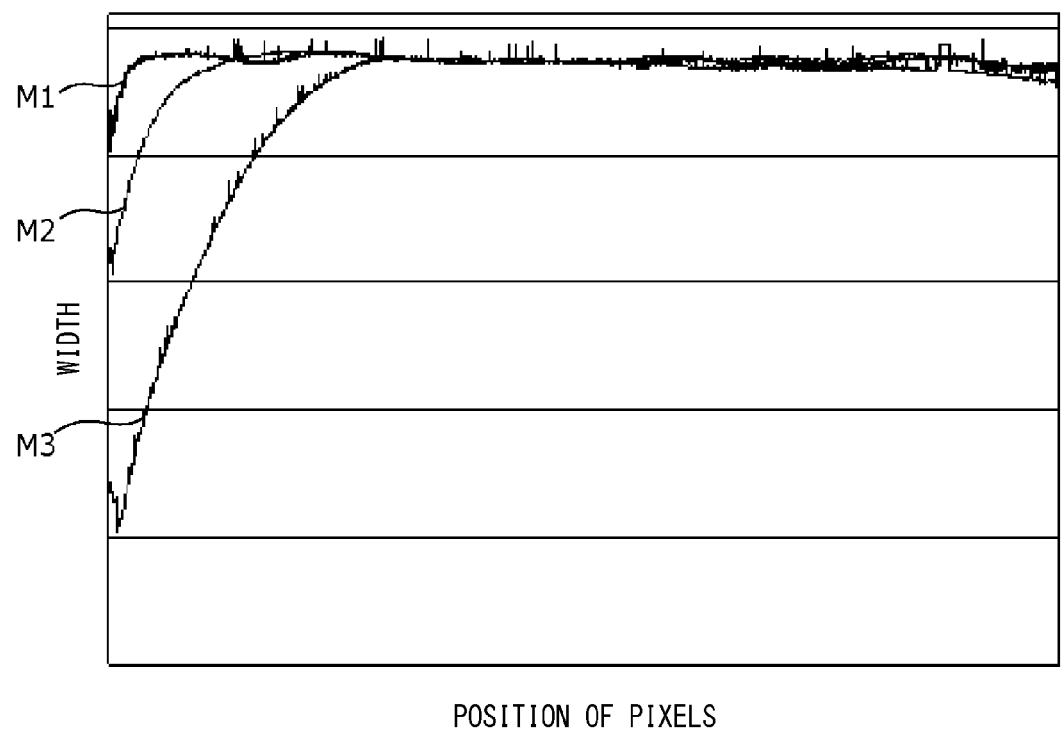
FIG. 5 is a graph showing a relationship between the position of the pixels in the input image of the book placed on the platen in the opened wide state and a width of the input image shown in FIG. 3 in the image reading apparatus of the embodiment of the present disclosure.
Figure 6:
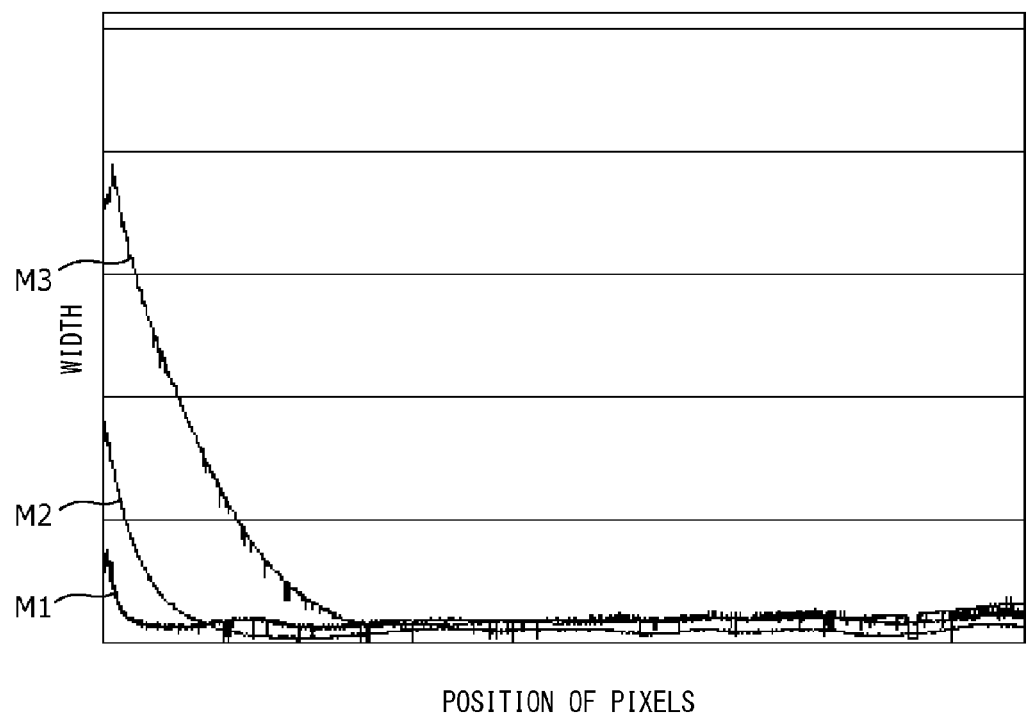
FIG. 6 is a graph showing the relationship between the position of the pixels in the input image of the book placed on the platen in the opened wide state and the width of the input image shown in FIG. 3 in the image reading apparatus of the embodiment of the present disclosure.

FIGS. 5 and 6 are graphs used for explaining a relationship between the position of the pixels in the input image of the book placed on the platen in the opened wide state and the width shown in FIG. 3. FIG. 6 is reverse of FIG. 5 upside down. That is, a width shown in FIG. 6 is obtained by subtracting the width shown in FIG. 5 from the maximum width (i.e., the width of the part where the book is in close contact with the contact glass).

A property M1 in FIGS. 5 and 6 indicates one exemplary relationship between the position of the pixels and the width in the input image in a case where the book placed on the platen is pressed by the document cover (including the automatic document feeding device). In this case, because the book is pressed by the document cover, the floating of the bind portion from the platen is small and the width around the bind position is long.

A property M2 in FIGS. 5 and 6 indicates one exemplary relationship between the position of the pixels and the width in the input image in a case where the book placed on the platen is pressed by hands of the user without pressing the book by the document cover (including the automatic document feeding device). In this case, because the book is pressed by the hands, the floating of the bind portion from the platen is slightly small and the width around the bind position is slightly long.

A property M3 in FIGS. 5 and 6 indicates one exemplary relationship between the position of the pixels and the width in the input image in a case where the book placed on the platen is pressed neither by the document cover (including the automatic document feeding device) nor the hands of the user. In this case, because the book is pressed neither by the document cover nor the hands, the floating of the bind portion from the platen is large and the width around the bind position is short, as compared to the cases of properties M1 and M2.

As shown in FIGS. 4 through 6, it can be seen that there is a correlation between the relationship between the position and the density of the pixels and the relationship between the pixel position and the width. In the embodiment, by utilizing such a characteristic, a value of a density correcting parameter corresponding to the above-mentioned width is specified and density correction is executed on the basis of the value of the density correcting parameter, and accordingly, the density of a part having excessive density around the bind portion is suitably reduced.

In the embodiment, the density correcting part 14 corrects the density of each pixel within each line by input-output properties based on the value of the above-mentioned density correcting parameter. In the embodiment, the input-output properties may be a linear function.

Figure 7:
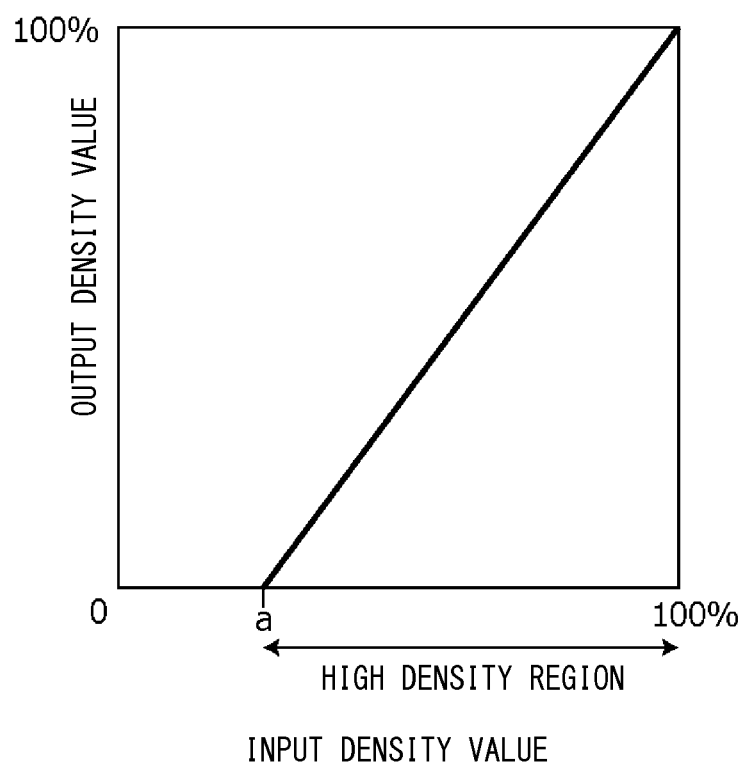
FIG. 7 is a graph showing one exemplary input-output properties of a density correcting part of the image processing part shown in FIG. 2 in the image reading apparatus of the embodiment of the present disclosure.

FIG. 7 is a graph used for explaining one exemplary input-output properties of the density correcting part 14 shown in FIG. 2. For example, as shown in FIG. 7, the density correcting part 14 changes the input-output properties in accordance with the value of the density correcting parameter a. In the case of FIG. 7, if the linear function of the input-output properties is presumed by a numerical expression of $f(x)=P \cdot x + Q$ (where, the variable of x is an input density value), the invariables of P and Q are determined by numerical expressions of $P=-1/(a-1)$ and $Q=a/(a-1)$ by using the density correcting parameter a. If x is equal to or less than a, the linear function results in $f(x)=0$.

For example, with regard to a target line (a line to be corrected by the density correcting part 14), the value of the density correcting parameter a can be obtained from the following equation:

$$a = (\text{maximum width} - \text{width of target line})/\text{maximum width} * k.$$

Herein, the maximum width is a maximum value of widths of all lines of the input image, and the factor of k is a predetermined coefficient.

This input-output properties is used for converting an input density value within a high density region specified by the value of the density correcting parameter to an output density value within a density region wider than the high density region. That is, in the case of FIG. 7, the high density region from the value a (a>0%) of the density correcting parameter to 100% is converted to a density region from 0% to 100%.

Furthermore, in the embodiment, the input-output properties makes the output density value be equal to or less than the input density value.

As shown in FIG. 1, the memory 3 is a volatile memory, such as a DRAM (Dynamic Random Access Memory). In the memory 3, a memory area required for the processing of the image processing part 2 and others is suitably assured.

The main control part 4 controls the scanner part 1, the image processing part 2, the memory 3 and the output part 5.

The output part 5 outputs image data processed by the image processing part 2.

Next, operations of the above-mentioned image reading apparatus will be described.

When the user places the book on the platen of the scanner part 1 and carries out a predetermined manipulation, the scanner part 1 reads an image of the book and outputs data of the input image to the image processing part 2.

In the image processing part 2, the width specifying part 11 specifies a width of each line and specifies the above-mentioned maximum width of the input image. The bind portion region specifying part 13 specifies a bind portion region of the input image.

Subsequently, the parameter value specifying part 12 specifies the value a of a density correcting parameter corresponding to the width of each line.

Then, the density correcting part 14 corrects density of pixels within the bind portion region among pixels belonging to each line by the input-output properties corresponding to the value a of the density correcting parameter of the line.

As described above, according to the above-mentioned embodiment, the width specifying part 11 specifies the width between the both ends of the input image about each line of the input image of the book, the parameter value specifying part 12 specifies the value of the density correcting parameter corresponding to the width specified by the width specifying part 11, and the density correcting part 14 corrects the density of each line on the basis of the value of the density correcting parameter specified by the parameter value specifying part 12.

Accordingly, because the density of the bind portion is automatically corrected to an appropriate density, it is possible to eliminate the noise of the bind portion without coercing the extra labor and the wasteful reading and copying of the image.

While the above-mentioned embodiment illustrates preferable examples of the present disclosure, the present disclosure is not restricted by the embodiment, and the embodiment can be changed or modified without departing from the scope and spirit of the present disclosure.

The present disclosure is applicable to an image reading apparatus, such as a scanning machine, a copying machine and a multi-function peripheral.

What is claimed is:

1. An image processor, comprising:
a width specifying part configured to specify a width between both ends of an input image of a book about each line of the input image;
a parameter value specifying part configured to specify a value of a density correcting parameter corresponding to the width specified by the width specifying part; and
a density correcting part configured to correct density of each line on the basis of the value of the density correcting parameter specified by the parameter value specifying part,
wherein the parameter value specifying part obtains, on the basis of a width of a target line to be corrected by the density correcting part and a maximum width of the input image, the density correcting parameter a; and
the density correcting part obtains the invariables of P and Q on the basis of the density correcting parameter a by numerical expressions of $P=-1/(a-1)$ and $Q=a/(a-1)$ and determines the input-output properties of f(x) regarding the input density value x by a linear function of $f(x)=P \cdot x+Q$.

2. The image processor according to claim 1, wherein
the density correcting part corrects the density of each pixel within each line by input-output properties on the basis of the value of the density correcting parameter; and
the input-output properties is determined so as to convert an input density value within a high density region specified by the value of the density correcting parameter to an output density value within a density region wider than the high density region.

3. The image processor according to claim 2, wherein
the density correcting part utilizes the input-output properties making the output density value be equal to or less than the input density value.

4. The image processor according to claim 1, further comprising:
a bind portion region specifying part configured to specify a bind portion region in the input image of the book;
wherein the density correcting part is configured to correct density within the bind portion region and not to correct density of a region other than the bind portion region.

5. An image reading apparatus comprising:
an image processing device; and
a scanner part configured to read an input image from a book,
wherein the image processing device includes:
a width specifying part configured to specify a width between both ends of the input image of the book about each line of the input image;
a parameter value specifying part configured to specify a value of a density correcting parameter corresponding to the width specified by the width specifying part; and
a density correcting part configured to correct density of each line on the basis of the value of the density correcting parameter specified by the parameter value specifying part, wherein the parameter value specifying part obtains, on the basis of a width of a target line to be corrected by the density correcting part and a maximum width in which the book is in close contact with a contact glass of the scanner part, the density correcting parameter a by using a predetermined coefficient k with a numerical expression of a=(maximum width−width of target line)/maximum value*k; and the density correcting part obtains the invariables of P and Q on the basis of the density correcting parameter a by numerical expressions of P=−1/(a−1) and Q=a/(a−1) and determines the input-output properties of f(x) regarding the input density value x by a linear function of f(x)=P·x+Q.

6. The image reading apparatus according to claim 5, wherein
the density correcting part corrects density of each pixel within each line by input-output properties on the basis of the value of the density correcting parameter; and
the input-output properties is determined so as to convert an input density value within a high density region specified by the value of the density correcting parameter to an output density value within a density region wider than the high density region.

7. The image reading apparatus according to claim 6, wherein the density correcting part utilizes the input-output properties making the output density value be equal to or less than the input density value.

8. The image reading apparatus according to claim 5, further comprising:
a bind portion region specifying part configured to specify a bind portion region in the input image of the book;
wherein the density correcting part is configured to correct density within the bind portion region and not to correct density of a region other than the bind portion region.

9. The image processor according to claim 1, wherein the parameter value specifying part determines the density correcting parameter a as a value proportional to a value calculated by a numerical expression of (maximum width−width of target line)/maximum value.

10. The image reading apparatus according to claim 5, wherein the parameter value specifying part determines the density correcting parameter a as a value proportional to a value calculated by a numerical expression of (maximum width−width of target line)/maximum value.

* * * * *